(12) United States Patent
Wilson

(10) Patent No.: US 7,350,790 B1
(45) Date of Patent: Apr. 1, 2008

(54) MULTI-FUNCTION, ALL-TERRAIN DOLLY FOR A SNOWMOBILE OR THE LIKE

(76) Inventor: Jassen Wilson, P.O. Box 230, Moravia, NY (US) 13118

(*) Notice: Subject to any disclaimer, the term of this patent is extended or adjusted under 35 U.S.C. 154(b) by 397 days.

(21) Appl. No.: 11/111,313

(22) Filed: Apr. 21, 2005

Related U.S. Application Data

(60) Provisional application No. 60/615,034, filed on Oct. 1, 2004.

(51) Int. Cl.
*B62B 1/00* (2006.01)
*B62C 1/00* (2006.01)
*B62D 53/04* (2006.01)
*B60D 1/155* (2006.01)

(52) U.S. Cl. .............. 280/47.131; 280/416; 280/414.1; 280/47.17; 280/47.24; 280/47.27; 280/47.29; 280/402; 280/47.12; 280/47.15; 280/63

(58) Field of Classification Search ........... 280/47.131, 280/47.17, 47.24, 47.27, 47.29, 402, 47.12, 280/63, 47.15, 414.1, 416
See application file for complete search history.

(56) References Cited

U.S. PATENT DOCUMENTS

| | | | | |
|---|---|---|---|---|
| 1,308,537 | A | * | 7/1919 | Weaver ................... 280/47.15 |
| 4,566,708 | A | * | 1/1986 | Specie ................... 280/47.131 |
| 5,306,112 | A | * | 4/1994 | Kielinski ..................... 414/491 |
| 5,632,498 | A | | 5/1997 | Beaudet et al. |
| 5,716,061 | A | | 2/1998 | Sloan et al. |
| D409,124 | S | * | 5/1999 | Bank .......................... D12/162 |
| 6,045,123 | A | | 4/2000 | Christen |
| 6,309,167 | B1 | * | 10/2001 | Mc Pherrin ................. 414/457 |
| 6,637,761 | B1 | * | 10/2003 | Boettcher ................ 280/47.24 |
| 6,663,136 | B2 | * | 12/2003 | Stevens ...................... 280/511 |
| 2003/0062699 | A1 | | 4/2003 | Gargaro | |

* cited by examiner

*Primary Examiner*—Christopher P. Ellis
*Assistant Examiner*—John R. Olszewski
(74) *Attorney, Agent, or Firm*—Mark Levy & Associates, PLLC

(57) ABSTRACT

A snowmobile dolly usable with a wide variety of snowmobiles of different sizes and/or designs. The dolly approaches the snowmobile from the front and engages its front bumper. A downward force on the tongue of the dolly raises the snowmobile and positions the front wheels of the dolly under the front of the snowmobile. An auxiliary rear axle is then slid under a rear portion of the snowmobile. A swivel connection on the front bumper-engaging member allows the snowmobile supported by the dolly to be easily maneuvered in tight spaces. An additional feature of the dolly is that it may also be reconfigured for use as a jack stand allowing service or repair work to be performed. The dolly is adapted to be towed behind a riding lawnmower, yard tractor, or the like, further enhancing the utility of the dolly.

17 Claims, 12 Drawing Sheets

MULTI-FUNCTION, ALL-TERRAIN DOLLY FOR A SNOWMOBILE OR THE LIKE

RELATED APPLICATIONS

This application claims priority in accordance with 37 C.F.R. §1.78 to Provisional Patent Application Ser. No. 60/615,034, filed Oct. 1, 2004.

FIELD OF THE INVENTION

The invention pertains to dollies and, more particularly, to a multi-function, all-terrain, two-part dolly for transporting a snowmobile, personal watercraft, ATV, law mower and the like.

BACKGROUND OF THE INVENTION

Owners of snowmobiles and the like often have need to manually move the snowmobile during periods of non-use. Such manual movement may be required to place or reposition the snowmobile in a storage spot, to temporarily move the snowmobile around on the floor of a garage, barn, shed, or similar structure for maintenance, or merely to get the snowmobile temporarily out of the way. Because of the bulk and weight of a snowmobile, it is difficult for one person to reposition the vehicle without power. In addition, the track and skis of the snowmobile are somewhat fragile and may be damaged by indiscriminate moving or dragging these structures across a surface.

Many snowmobile owners also opt to perform their own maintenance and repairs on their snowmobile(s). For this reason, it is also advantageous that any device designed to move a snowmobile around, for example in a garage, be adapted as a lift and/or jack stand to allow servicing the snowmobile. The inclusion of such functionality prevents the necessity for multiple pieces of support equipment which may take up valuable storage space when not in use. This functionality is not provided in prior art snowmobile dollies.

DISCUSSION OF THE RELATED ART

Dollies designed to facilitate movement of snowmobiles are known in the prior art. However, each of the known prior art snowmobile dollies suffers from at least one serious limitation.

U.S. Pat. No. 5,632,498 for SNOWMOBILE DOLLY SYSTEM, issued May 27, 1997 to Ernie Beaudet et al. teaches one such dolly. The BEAUDET et al. dolly is a three-piece unit, one piece adapted for placement under each of the front skis, a third piece adapted for placement under the track and rear portion of the snowmobile. The BEAUDET et al. dolly is equipped with small-diameter casters which may function properly on smooth, clean surfaces but become totally unusable on rough surfaces such as gravel, uneven ground, or the like. In addition, the freedom of independent movement provided by the BEAUDET et al. casters makes steering and/or otherwise maneuvering a snowmobile mounted on the BEAUDET et al. dolly difficult at best. BEAUDET et al. provide no built-in mechanism for helping position a snowmobile on the dolly.

U.S. Pat. No. 5,716,061 for DOLLY FOR MOVING A SNOWMOBILE, issued Feb. 10, 1998 to Ken Sloan et al. teaches another dolly for a snowmobile. The SLOAN et al. apparatus is first slid under the front end of the snowmobile. Once in place, a complicated jack mechanism is used elevate the track (i.e., rear) portion of the snowmobile above the ground. Only when the track is raised may auxiliary support wheels optionally be put in place.

U.S. Pat. No. 6,045,123 for SNOWMOBILE TRACK LIFT, issued Apr. 4, 2000 to Mark Charles Christen teaches a snowmobile jack suitable for raising the track of a snowmobile above a floor surface. Once raised, a retaining pin may be used to secure the snowmobile at the desired height. No provision is made for moving the elevated snowmobile.

Published United States Patent Application 2003/0062699 for OVERSIZED MASSIVE BREAK APART DOLLY, published Apr. 3, 2003 upon application by Nicholas Gargaro teaches a wheeled framework adapted to be slid under a snowmobile or the like. When in place, the weight of an operator brings the dolly handle downward, thereby pivoting the snowmobile or other load upward. Once rotated, the GARGARO dolly may be used to move its load. However, having only two wheels, as well as having the load cantilevered forward of the two wheels, manipulation of the load is, at best, difficult.

In contradistinction, the snowmobile dolly of the invention overcomes all these limitations of the prior art.

SUMMARY OF THE INVENTION

The present invention provides a simple, easy to use, snowmobile dolly that is usable with a large variety of snowmobiles of different sizes and/or designs. The dolly which consists of a simple, wheeled framework, approaches the snowmobile from the front and engages its front bumper, typically with a U-shaped connected. A downward pressure exerted on the handle and tongue of the inventive dolly raises the front of the snowmobile and causes the dolly's front wheels mounted to the dolly's transverse axle to move under a front portion of the snowmobile.

An auxiliary axle having a relatively large diameter wheel disposed at each end is first slid or placed under the snowmobile's track, thus affording the user elevated use. A 360° swivel forming a part of the front support mechanism of the dolly allows the snowmobile placed thereupon to be easily maneuvered in tight spaces. An additional feature of the inventive dolly is that it may also serve as a secure jack stand holding the snowmobile elevated to allow service or repair work to be performed. The distal end of the dolly handle is adapted to form a hitch component to facilitate pulling the snowmobile behind a riding lawn mower, yard tractor, or the like, further enhancing the utility of the dolly.

The construction is simple and the complicated jack mechanisms and other linkages of the prior art are eliminated, thereby yielding a low cost, easy-to-use, reliable snowmobile dolly.

It is therefore an object of the invention to provide a snowmobile dolly adaptable for use with a wide range of snowmobile sizes and designs.

It is another object of the invention to provide a snowmobile dolly that easily lifts the snowmobile from the rear to allow an auxiliary axle to be inserted under the track thereof.

It is another object of the invention to provide a snowmobile dolly having a swivel connect at the point of support of the front of the snowmobile.

It is a still further object of the invention to provide a snowmobile dolly which may securely hold a snowmobile elevated to allow service or repair thereof.

It is an additional object of the invention to provide a snowmobile dolly which has wheels of sufficient diameter to allow easily moving and maneuvering a snowmobile over rough terrain such as gravel.

It is yet another object of the invention to provide a snowmobile dolly which may be easily towed behind a riding lawnmower or yard tractor.

It is another object of the invention to provide a snowmobile dolly which may be equipped with a ball hitch to allow towing the snowmobile behind a truck, car, or other vehicle having a traditional ball trailer hitch.

It is a further object of the invention to provide a snowmobile dolly which is simple in design and which is inexpensive to manufacture.

It is a still further object of the invention to provide a snowmobile dolly having a reconfigurable tongue allowing the dolly to perform multiple functions depending upon the selected handle configuration.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

The dolly of the present invention is designed to be a simple, reconfigurable, versatile tool useful to an equipment owner. For purposes of this description, the term "snowmobile" is meant to include all movable equipment including, but not limited to, snowmobiles, personal watercraft, ATV's, and the like. It allows easily moving a snowmobile over uneven terrain, either by human power or by attaching the tongue of the dolly to a riding lawnmower, yard tractor, or in alternate embodiments by a vehicle equipped with a conventional ball hitch.

Figure 1:
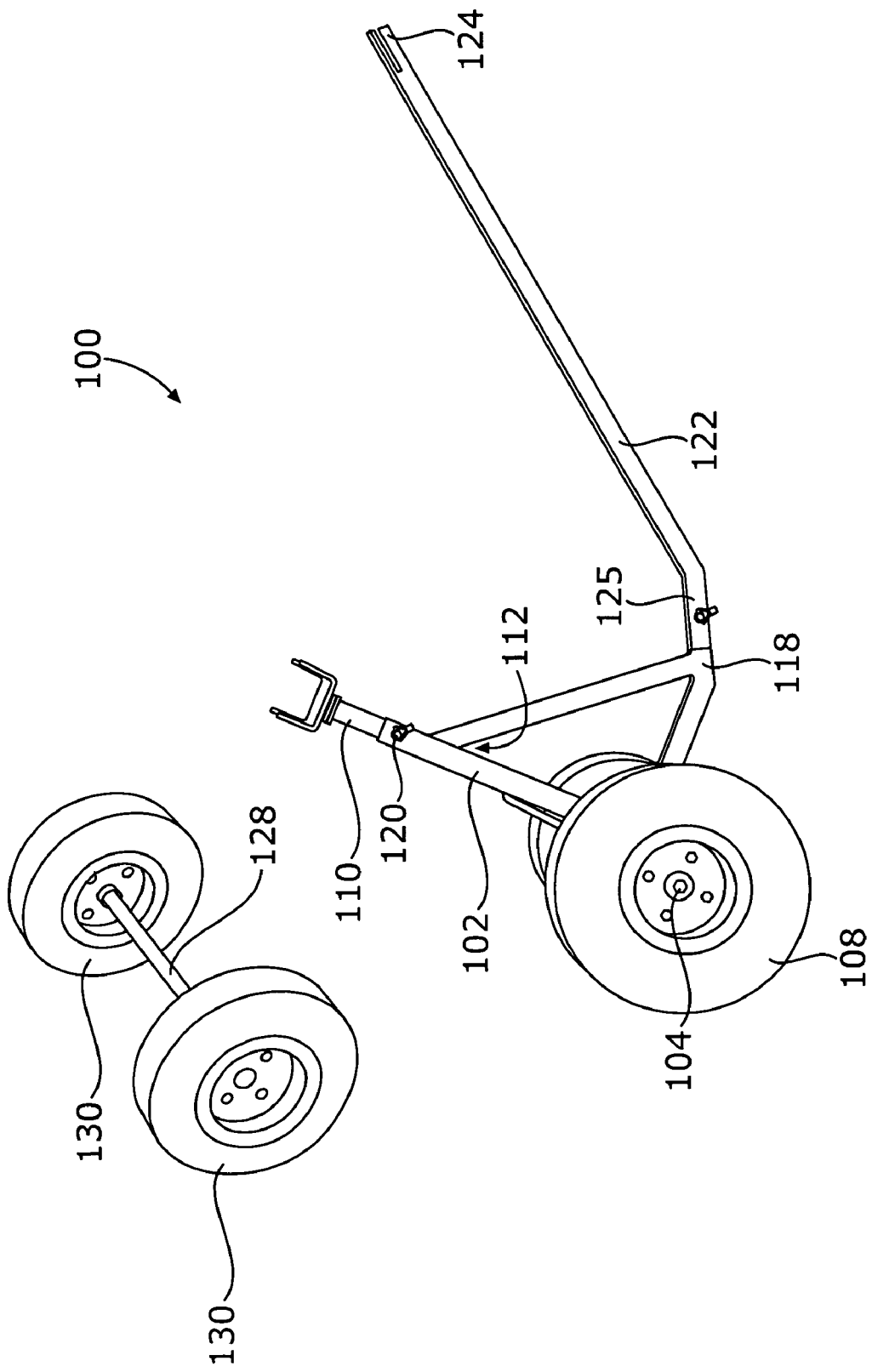
FIG. 1 is a side, perspective pictorial view of the snowmobile dolly of the invention.
Figure 2:
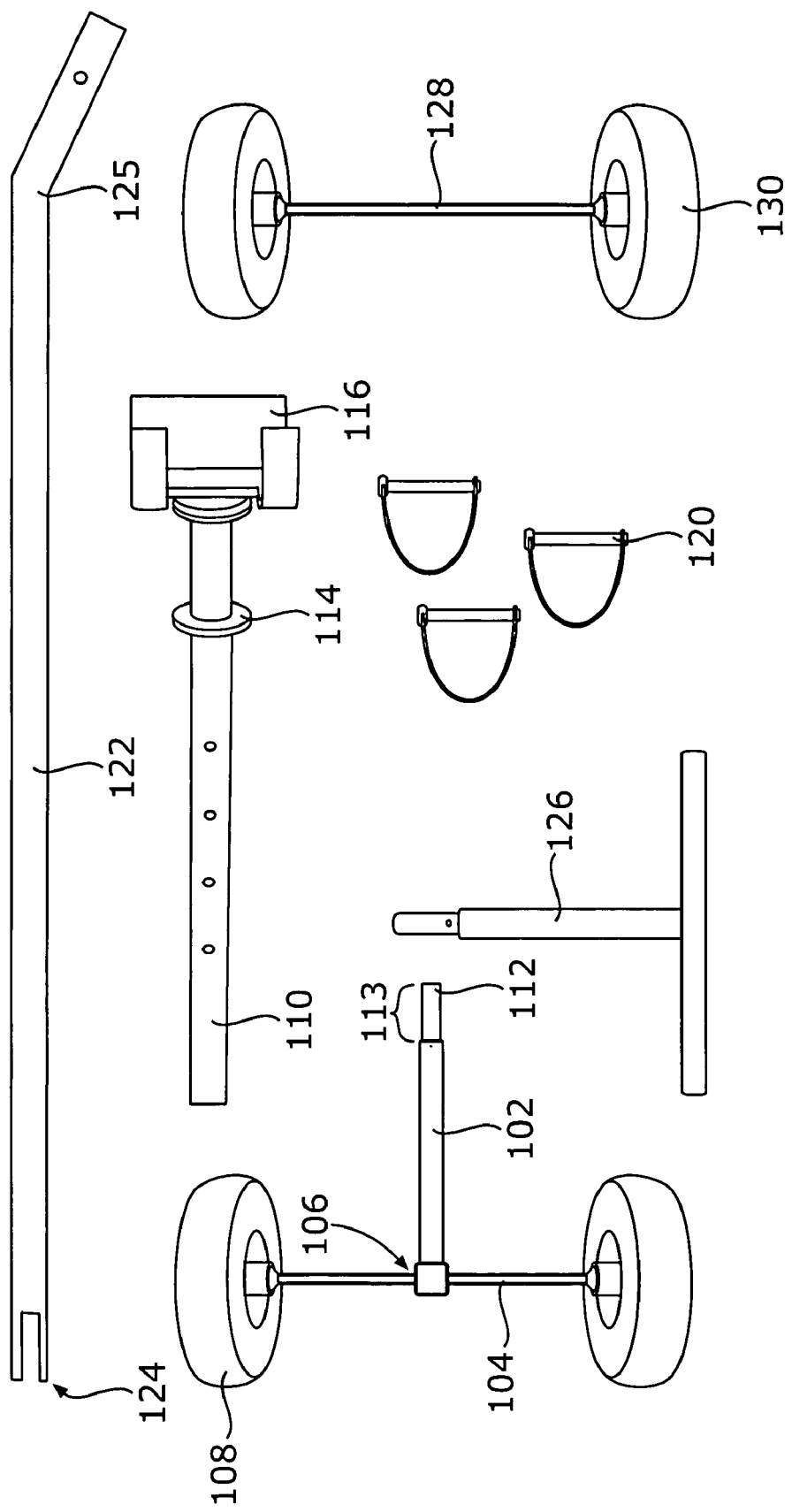
FIG. 2 is an exploded pictorial view showing the components of the dolly of FIG. 1 prior to assembly thereof.

Referring first to FIGS. 1 and 2, there are shown a side, perspective, pictorial view and an exploded view of the components, respectively, of the snowmobile dolly of the invention, generally at reference number 100. A front support unit 102 is configured in a substantially triangular form, in the preferred embodiment, and supports a transverse front axle 104 disposed proximate a first vertex 106 thereof and extending substantially perpendicular to the plane of front support unit 102. Front support unit 102 is typically constructed from square tubing sections welded or otherwise suitably fastened at three vertices 106, 112, and 118. While square steel tubing has been chosen for purposes of disclosure, it will be recognized that other cross-sectional shapes may also be used and that the form of the front support unit 102 need not be triangular. In still other embodiments, solid stock may be used to form front support unit 102 or one or more other components of the snowmobile dolly 100. In addition, materials other than steel may also be chosen. Consequently, the invention is not considered limited to a particular material, hollow or solid stock configuration, or a particular cross-sectional shape. Rather, the invention is seen to encompass any and all variations thereof.

Front wheels 108 are rotatively mounted at each end of front axle 104. The diameter of front wheels 108 is chosen to be sufficient for easy traverse of uneven or soft terrain by snowmobile dolly 100. Front wheels 108 may be equipped with rubber tires, either balloon or other types, as is well known in the art. Support braces 105 are provided to strengthen axle 104 and to prevent bending thereof.

Front support unit 102 is adapted to slidably and adjustably receive and retain at its second vertex 112, the proximal end of a front support post 110. Front support post 110 is typically retained on front support unit 102 by a lock pin 120 interacting with one of a series of holes 113 therein, thereby providing height adjustability, but such adjustability is not required. Front support post 110 has a swivel joint 114 disposed at its distal, swivel joint 114, in turn, connecting a U-shaped connector 116 to the distal end 117 of front support post 110. U-shaped connector 116 is adapted to surround a front bumper 131 of a snowmobile 134 (FIG. 3b) as will be described in detail hereinbelow. It will be recognized that other interface devices (e.g., non-U-Shaped devices) may be placed at the distal end of front support post 110 to meet a particular operating circumstance or environment and the invention is not considered limited to the U-shape configuration chosen for purposes of disclosure. Likewise, depending upon the model of snowmobile, the front bumper thereof may not be present or may not be suitable for this procedure. In such cases, a different connector or snowmobile lift location can be used.

A third vertex 118 of front support unit 102 is adapted and configured to slidably receive and retain a tongue 122 with pin 121. An offset 125 is formed in tongue 122 disposed near a proximal end thereof. The function of offset 125 will also be described in detail hereinbelow. A distal end 124 of tongue 122 is provided in a split configuration to facilitate attachment of tongue 122 to a motive device such as riding lawnmower or yard tractor, neither of which is shown. Although, in the preferred embodiment, tongue 122 is detachable and reconfigurable, tongue 122 may also be permanently attached in alternate embodiments.

An optional T-shaped handle 126 may be connected to distal end 124 of tongue 122 to facilitate movement of snowmobile dolly 100 by a person. T-shaped handle 126 is also typically provided with an offset 127 (FIG. 3d) to position the distal end 124 of tongue 122 in an ergonomically correct and convenient position for pushing or pulling snowmobile dolly 100 by a human operator. T-shaped handle 126 is typically connected to tongue 122 by a locking pin, not shown. It will be recognized that other handle configurations may be provided for attachment to distal end 124 of tongue 122. Consequently, the invention is not considered limited to the T-shaped handle 126 chosen for purposes of disclosure.

An independent rear axle 128 is provided with a rear wheel 130 rotatively mounted at each end thereof. Independent rear axle 128 with rear wheels 130 is adapted for easy placement under the track, not specifically identified, of a snowmobile 134 (FIG. 3b), when the snowmobile 134 is supported by dolly 100. Independent rear axle 128 may best be seen in its intended operating position in FIG. 5d.

Figure 3A:
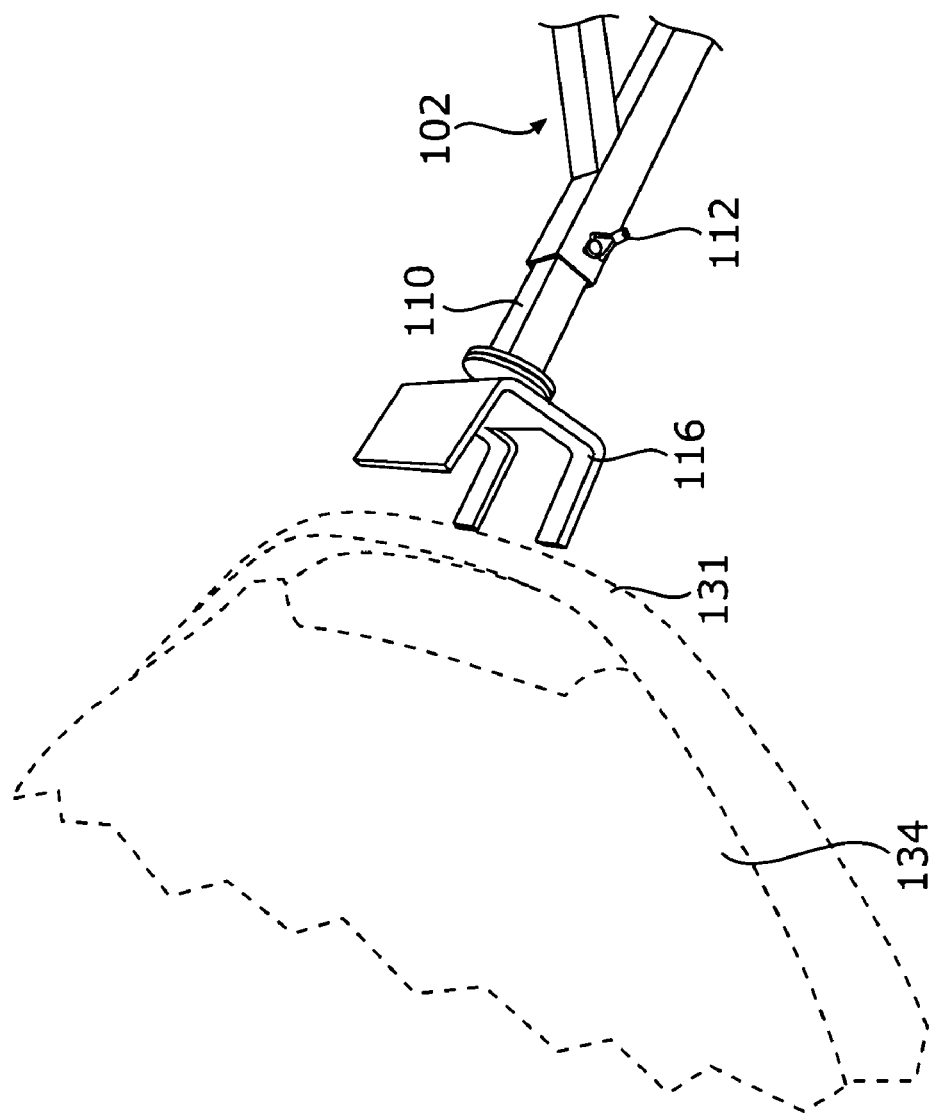
FIG. 3a is a detailed perspective pictorial view of the U-shaped connector of the dolly of FIG. 1 prior to connecting to a snowmobile's front bumper.
Figure 3B:
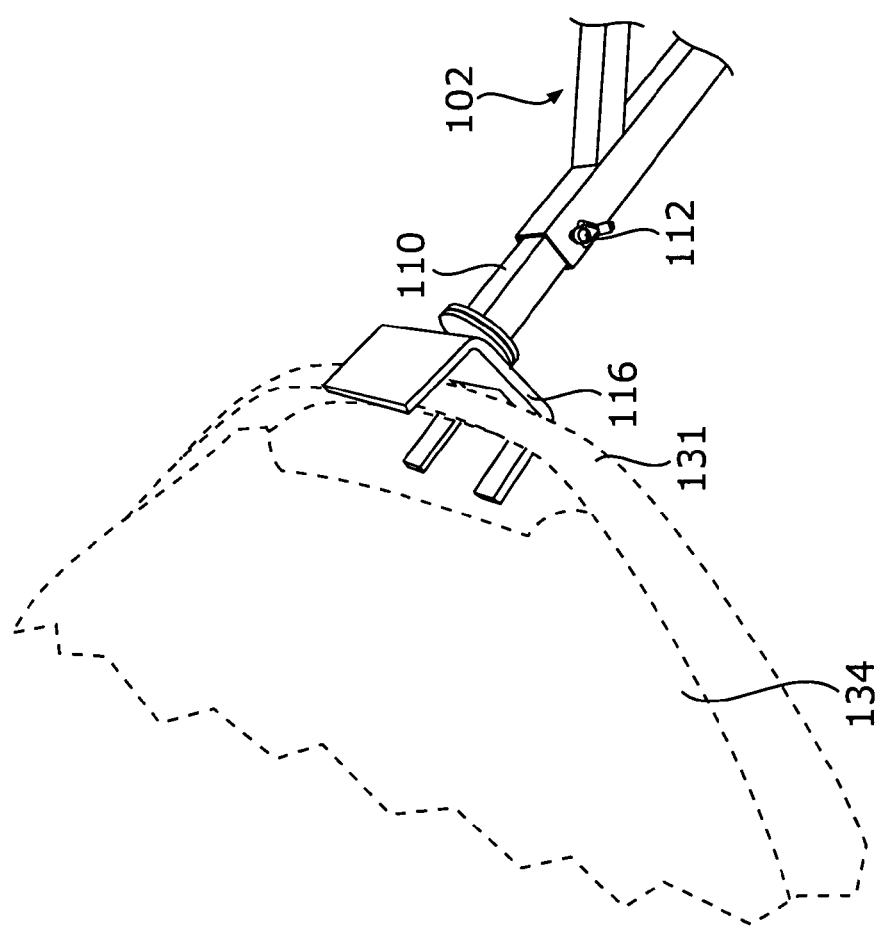
FIG. 3b is a detailed perspective pictorial view of the U-shaped connector of FIG. 3a after surrounding the front bumper of a snowmobile.
Figure 3C:
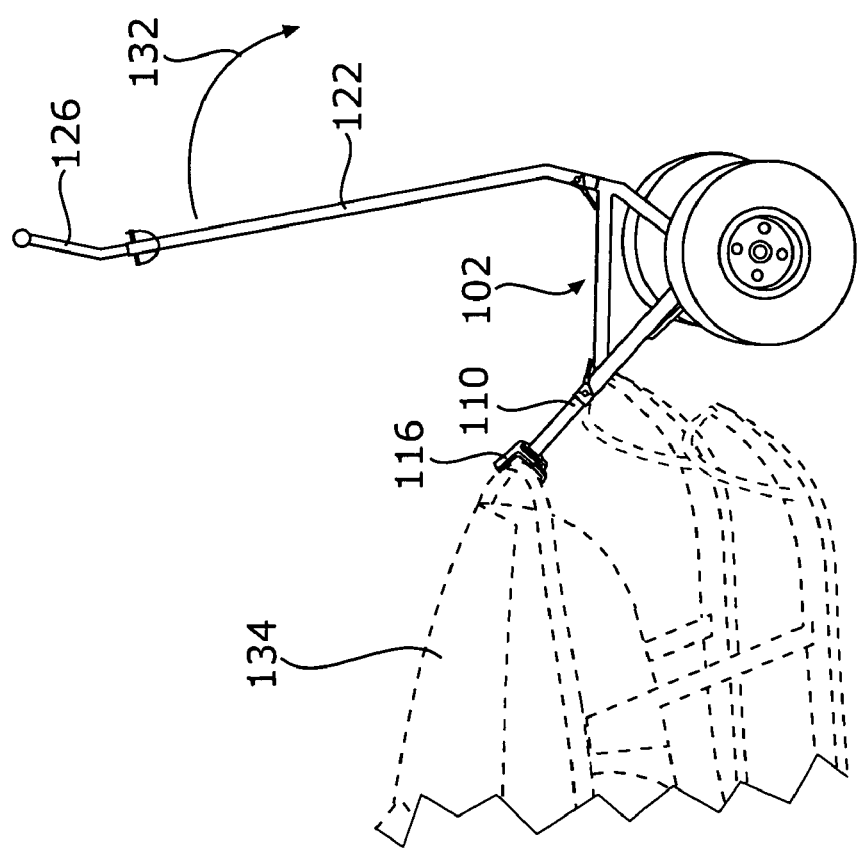
FIG. 3c is a side perspective pictorial view of the dolly of FIG. 1 having its U-shaped connector in the position of FIG. 3b.
Figure 3D:
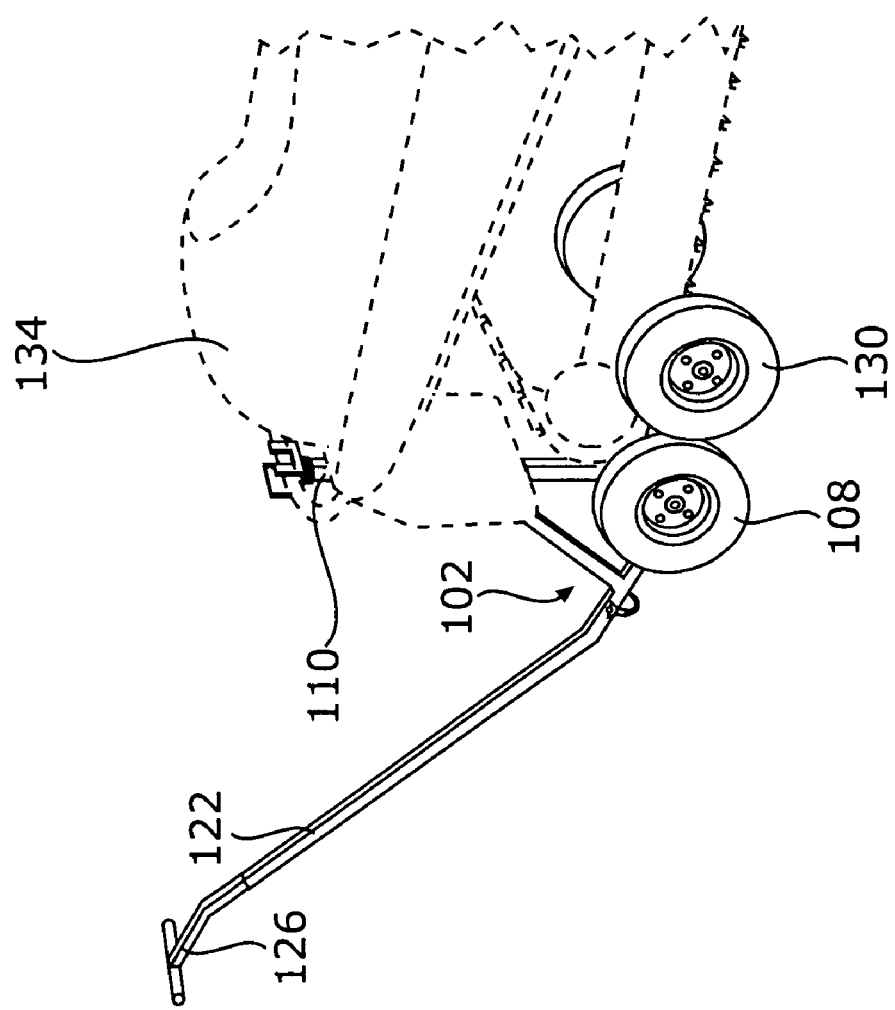
FIG. 3d is a side perspective pictorial view of the dolly of FIG. 1 showing how the auxiliary axel is positioned under the snowmobile by using the front of the inventive dolly.

Refer now also to FIGS. 3a-3d. In operation, snowmobile dolly 100 approaches the front bumper 131 of a snowmobile 134 as shown in FIG. 3a. Rear axle 128 must be placed under snowmobile 134 before lifting the front thereof (FIG. 3d). Tongue 122 is disposed in a substantially vertical orientation as may be seen in FIG. 3c. Front support post 110, however, is inclined with respect to the floor. U-shaped connector 116 is oriented via swivel joint 114 to align with the bumper 131 of snowmobile 134. A slight additional forward movement (i.e., left to right as seen in FIGS. 3a and 3b) allows U-shaped connector 116 to encircle bumper 131 as may be seen in FIG. 3b. Once U-shaped connector 116 has engaged bumper 131, tongue 122 may be pulled down in a direction shown by arrow 132 (FIG. 3c). This is accomplished by application of downward pressure on T-shaped handle 126.

Once U-shaped connector 116 has grasped bumper 131 and downward pressure has been applied to the distal end 124 of tongue 122 through T-shaped handle 126, front axle 104 and front wheels 108 have moved under the snowmobile 134 as may be seen in FIG. 3d. Tongue 122 has moved from its substantially vertical orientation (FIG. 3c) to a position oblique to the floor. Front support post 110, however, has been reoriented into a substantially vertical orientation as may be seen in FIG. 3d. The snowmobile 134 has now also been elevated above the floor by using front support unit 102, allowing independent rear axle 128 with rear wheels 130 to be slid under the track of the snowmobile 134.

Figure 4A:
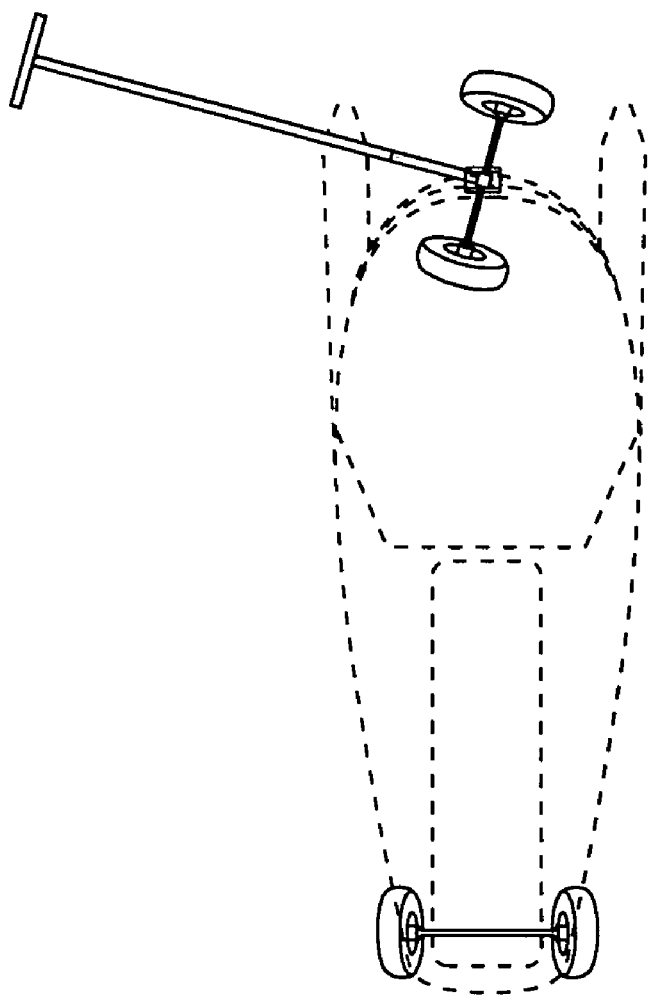
FIGS. 4a and 4b are top plan schematic views of the dolly of FIG. 3d, depicting the extremes in range of motion in a horizontal plane of the dolly's tongue.
Figure 4B:
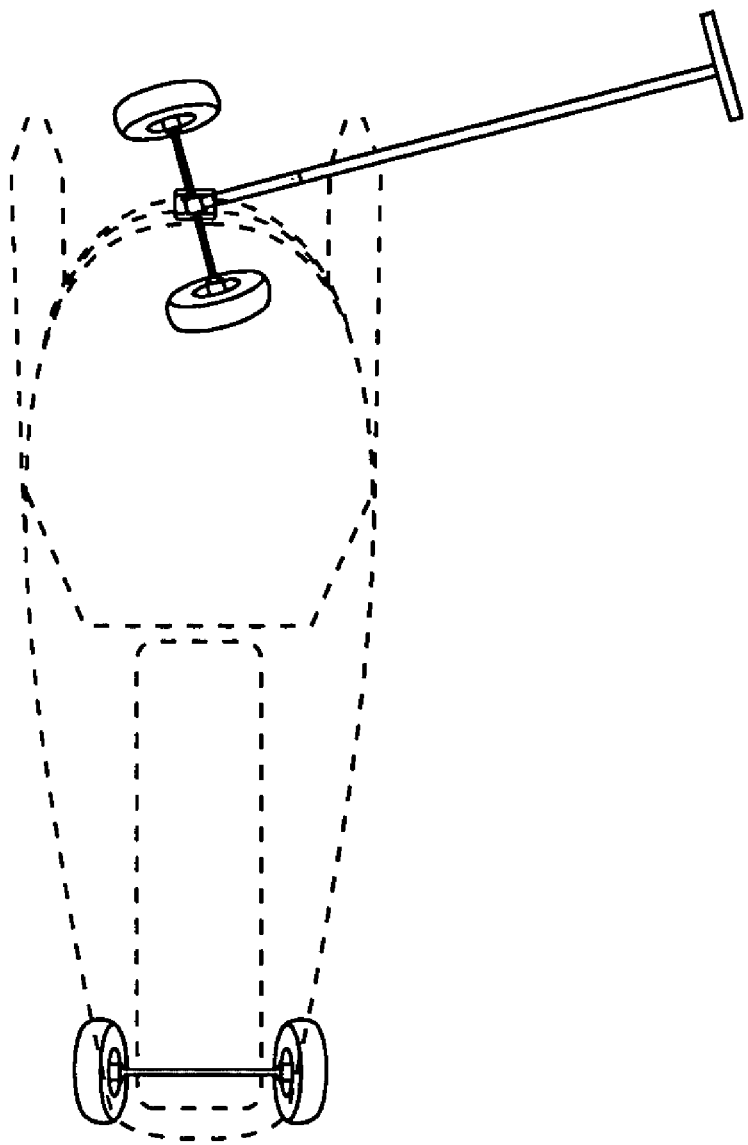

Swivel joint 114 at the distal end of now substantially vertical front support post 110 allows front axle 104 a wide range of motion in a plane substantially parallel to the floor or other surface upon which snowmobile dolly 100 is resting. This range of motion may readily be seen in FIGS. 4a and 4b where the rotation of axle 104 is limited only by interference between the body of snowmobile 134 and tongue 122.

Figure 5A:
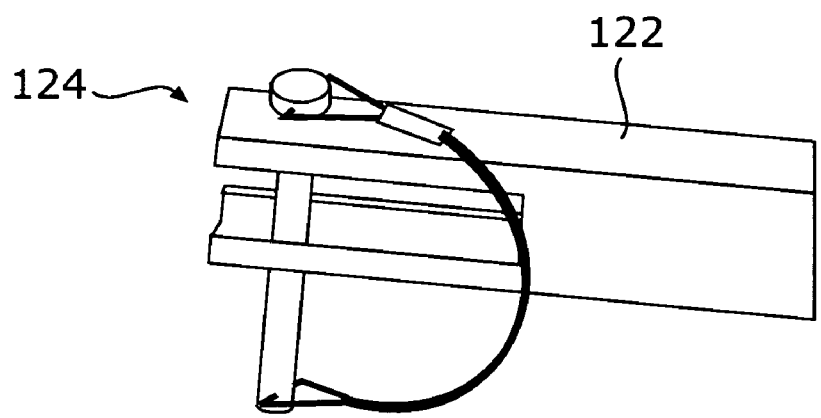
FIG. 5a is a detailed perspective pictorial view of the distal end of the tongue of the dolly of FIG. 1.
Figure 5B:
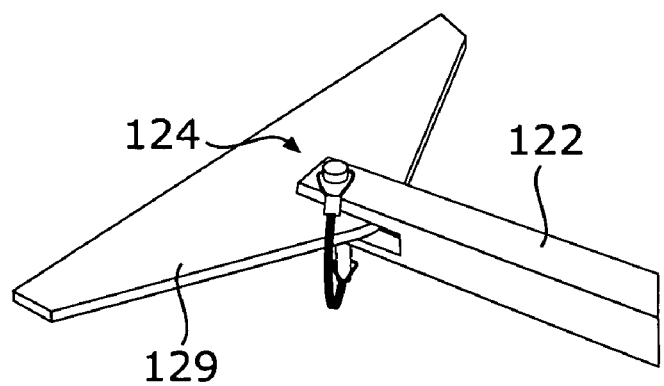
FIG. 5b is a detailed perspective pictorial view of the distal end of the tongue of FIG. 5a connected to a towing vehicle.

Referring now to FIGS. 5a and 5b, there are shown detailed views of the distal end 124 of tongue 122 (FIG. 5a). FIG. 5b shows a detailed view of distal end 124 of tongue 122 connected to a towing vehicle such as a riding lawnmower or a yard tractor, only a portion being shown in FIG. 5b.

Figure 5C:
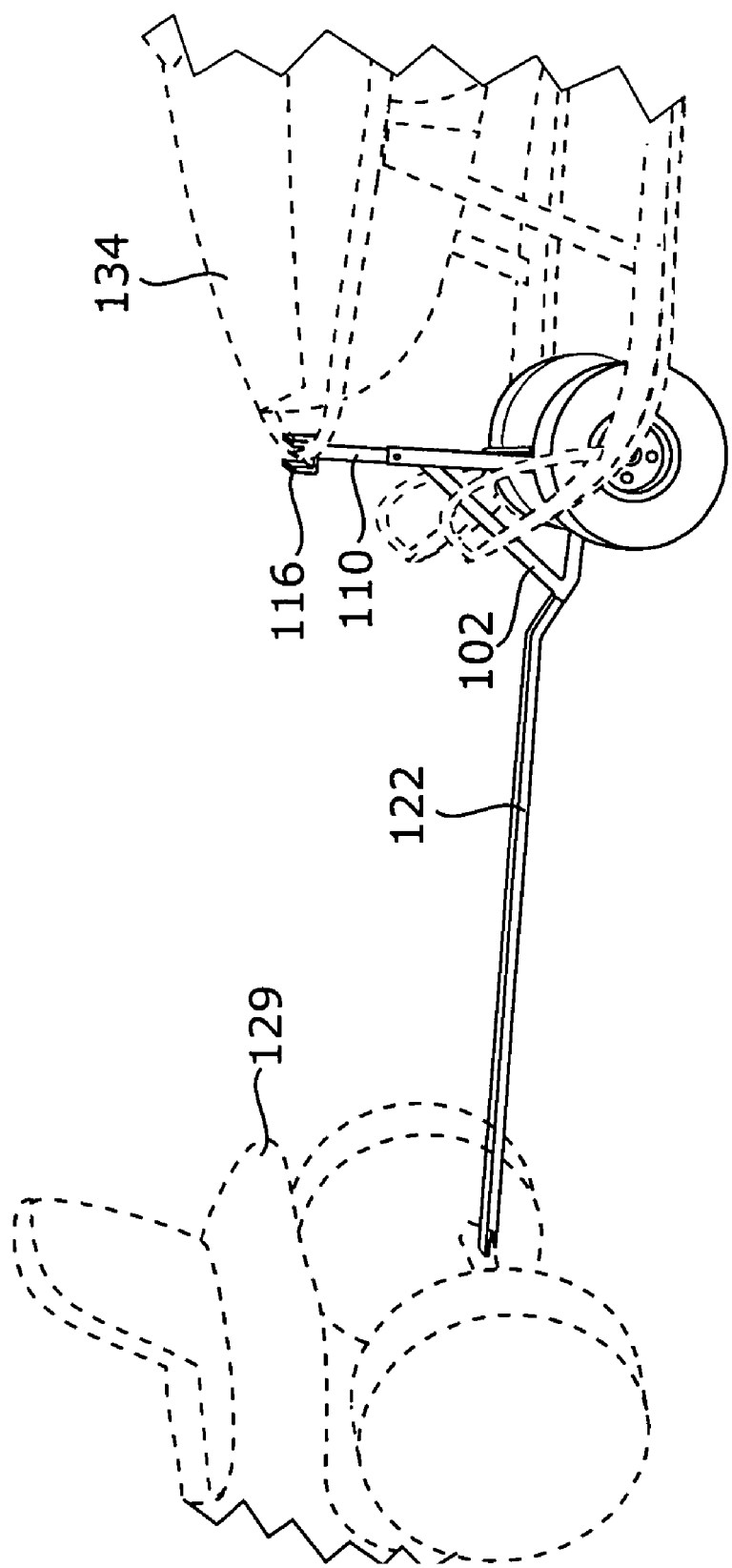
FIG. 5c is a perspective pictorial views of the dolly of FIG. 3d being towed in a straight path by a tractor.
Figure 5D:
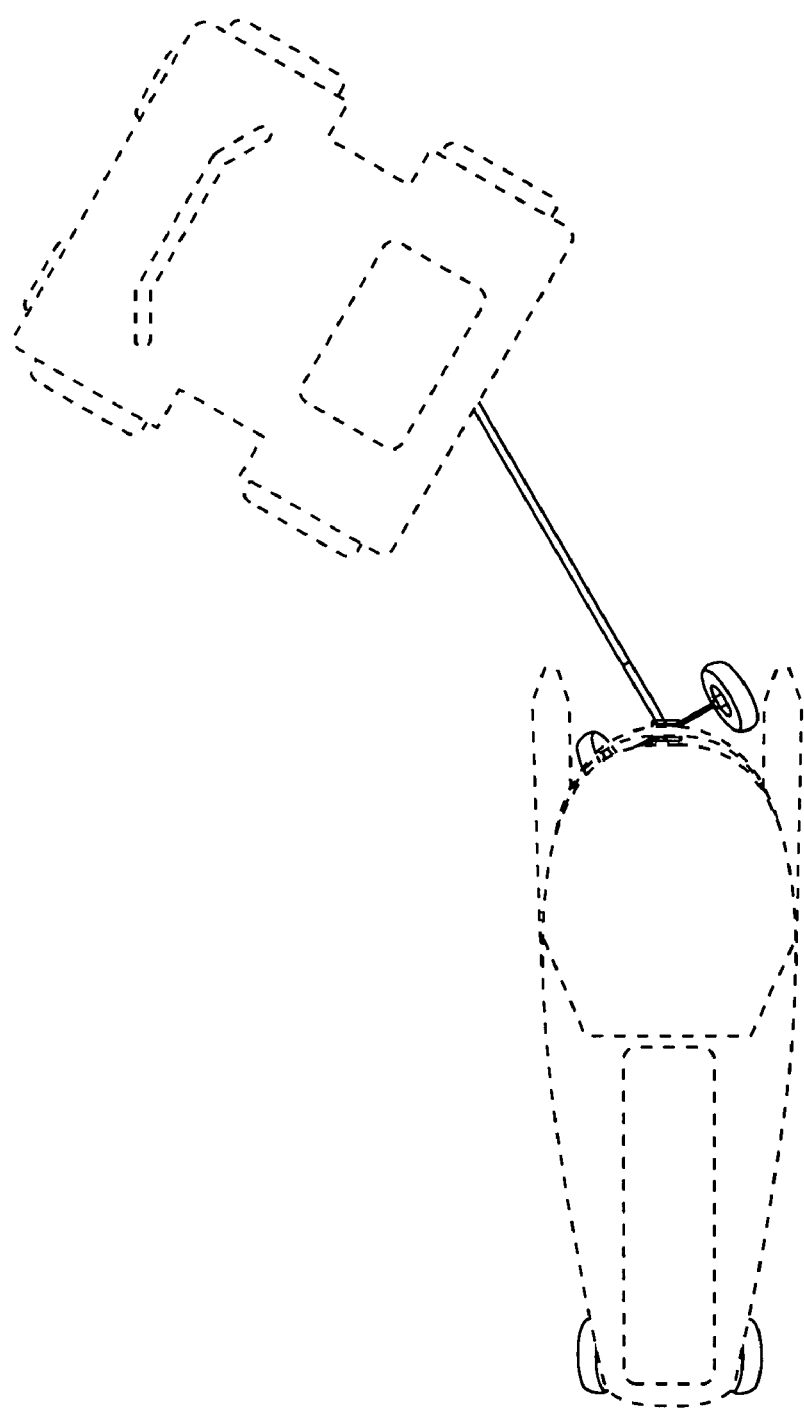
FIG. 5d is a top plan schematic view of the dolly of FIG. 3d being towed in a turning path by a tractor.

FIGS. 5c and 5d show snowmobile 134 upon snowmobile dolly 100 of the invention being towed in a straight direction (FIG. 5c) and turning a corner (FIG. 5d). In FIG. 5d, independent rear axle 128 and rear wheels 130 may be clearly seen under the track of snowmobile 134.

It will be recognized that a hitch, not shown, adapted for operative interaction with a standard ball hitch on a towing vehicle may be placed at the distal end 124 of tongue 122 to facilitate attachment of snowmobile dolly 100 to a towing vehicle so configured.

Figure 6:
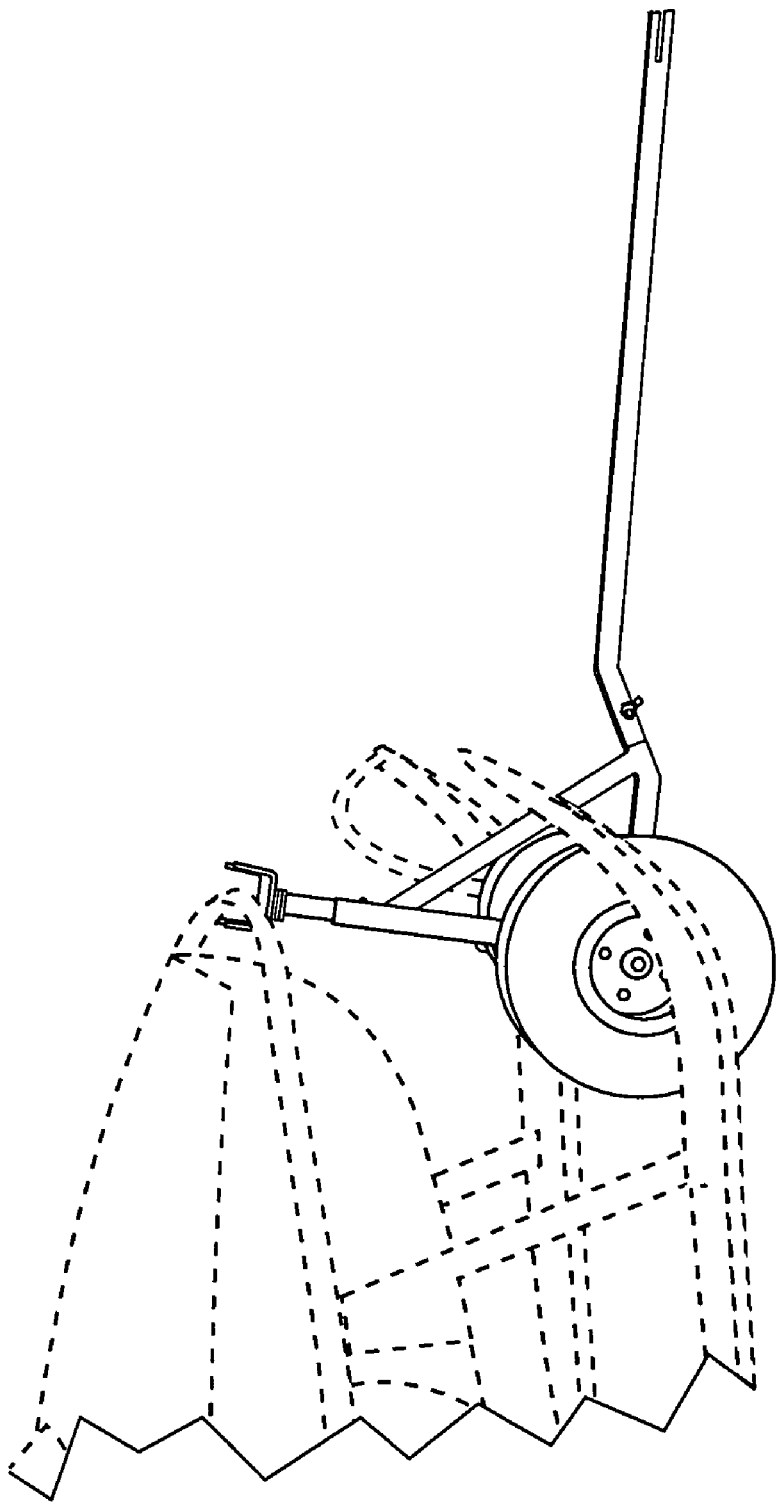
FIG. 6 is a side perspective view of the dolly of FIG. 1 reconfigured for use as a jack stand support for a snowmobile.

Referring now to FIG. 6, there is shown the snowmobile dolly 100 of the invention reconfigured to serve as a jack stand. It may be seen that tongue 122 has been inverted (i.e., rotated 180° around its major axis). This has, in effect, turned the offset 125 in tongue 122 upside down relative to its position as may be seen in FIG. 1. In this configuration, when tongue 122 is allowed to rest on the floor, snowmobile 134 is maintained in a stable position.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A dolly, comprising:
   a) a front support frame comprising a transverse axle having a wheel rotatively affixed at each end thereof;
   b) a front support post for lifting a snowmobile, said front support post having a proximal end attached to said front support frame, said front support post comprising a connector rotatively attached thereto proximate a distal end thereof;
   c) a tongue having a proximal end attached to said front support frame; and
   d) an independent rear axle having a wheel rotatively affixed at each end thereof.

2. The dolly as recited in claim 1, wherein said tongue comprises an offset formed therein.

3. The dolly as recited in claim 2, wherein said tongue may be rotatively reoriented with respect to said front support frame, thereby repositioning said offset.

4. The dolly as recited in claim 2, wherein said offset is disposed at a point nearer a proximal end of said tongue than to a distal end thereof.

5. The dolly as recited in claim 1, wherein said tongue comprises means for attaching disposed proximate a distal end thereof.

6. The dolly as recited in claim 5, wherein said means for attaching comprises means for attaching said tongue to at least one of: a handle, a riding lawnmower, a yard tractor, and a vehicle equipped with a ball hitch.

7. The dolly as recited in claim 1, wherein said front support frame comprises a substantially triangular shape.

8. The dolly as recited in claim 1, wherein said front proximal end of said front support post is adjustably attached to said front support frame for vertical and angular movement relative thereto.

9. The dolly as recited in claim 8, wherein said connector comprises a U shape.

10. The dolly as recited in claim 1, wherein said proximal end of said tongue is removably and reconfigurably attached to said front support frame.

11. The dolly as recited in claim 6, wherein said means for attaching comprises a mechanism for attaching said tongue to any plurality of hitch devices.

12. The dolly as recited in claim 1, further comprising a T-shaped handle.

13. The dolly as recited in claim 12, wherein said T-shaped handle is removably affixed to said front support frame.

14. The dolly as recited in claim 1, wherein at least one of said wheels affixed to said axles comprises a tire.

15. The dolly as recited in claim 9, wherein said U shaped connector is adapted to surround the front bumper of a snowmobile.

16. The dolly as recited in claim 1, wherein at least one of: said front support frame, said tongue, and said front support post comprises tubular material.

17. The dolly as recited in claim 16, wherein said tubular material comprises steel having a substantially square cross-sectional area.

* * * * *